United States Patent Office 3,810,859
Patented May 14, 1974

3,810,859
THICKENABLE ALKYL ACRYLATE LATICES
Bela K. Mikofalvy, Sheffield Lake, Ohio, assignor to The
B. F. Goodrich Company, New York, N.Y.
No Drawing. Continuation of abandoned application Ser.
No. 57,301, July 22, 1970. This application May 22,
1972, Ser. No. 255,539
Int. Cl. C08f 15/40, 37/00
U.S. Cl. 260—29.6 RW                               9 Claims

ABSTRACT OF THE DISCLOSURE

Alkyl acrylate polymer latices capable of developing high viscosities are prepared by intially polymerizing lower alkyl acrylates and a glycidyl ester to form a base polymer and then overpolymerizing an olefinically unsaturated carboxylic acid monomer. The resulting latices may be conveniently thickened by the addition of base without adding natural or synthetic thickeners to the latex.

This is a continuation of application Ser. No. 57,301, filed July 22, 1970 and now abandoned.

BACKGROUND OF THE INVENTION

Alkyl acrylate latices are well-known and have many industrial applications, most of which require high viscosity formulations. For example, paper, textile, upholstery fabric, rug and carpet back coatings, textile laminating, adhesives for flocking as well as other adhesive applications all require the use of high viscosity latex systems to suspend pigments, obtain suitable flow properties and prevent rapid soaking of the latex into the substrate. Since the alkyl acrylate latices are normally very fluid, thickening agents must be added to the latex to increase the viscosity to the desired level for use in most of these applications. Water soluble salts of poly(acrylic acid) and poly(methacrylic acid), copolymers of acrylic and methacrylic acids with lower alkyl acrylates, natural gums such as alginates, proteins such as casein and cellulose derivatives such as hydroxyethyl cellulose are typically used throughout the industry as thickening aids It is advantageous to have alkyl acrylate latices which are capable of being thickened without adding external thickening aids so that by simply adjusting the pH of the latex a high viscosity would be developed. It is particularly useful to have alkyl acrylate polymer latices capable of developing high viscosities at low total solids.

SUMMARY OF THE INVENTION

I have now discovered a method to develop highly viscous polymer latices without the use of conventional thickening aids. Additionally and even more significantly, the polymer latices of the present invention have greater thickening efficiency at low total solids. The polymers of this invention are obtained by overpolymerizing a small amount of an olefinically unsaturated carboxylic acid monomer, preferably acrylic acid or methacrylic acid, on an acrylic ester base polymer containing one or more lower alkyl acrylates and a glycidyl ester. These polymer latices have excellent thickening ability even at low total solids. High viscosities are obtained by adjusting the pH of the latex by the addition of an alkaline material.

The latices of the present invention are obtained by first polymerizing about 50–99.8% by weight based on the total monomers of a lower alkyl acrylate with about 0.1–10% by weight of a polymerizable glycidyl ester, typically of acrylic or methacrylic acid, and up to about 49% by weight of one or more other polymerizable comonomers, if desirable, to form a base polymer and then overpolymerizing about 0.1–10% by weight of an olefinically unsaturated carboxylic acid monomer after the polymerization of the base polymer has reached at least about 50% completion. Preferred polymer latices contain about 75–95% by weight of the lower alkyl acrylate ester, about 0.5–5% by weight of the glycidyl ester, 0.5–6% by weight acrylic and/or methacrylic acid and up to about 15% by weight one or more polymerizable comonomers. Excellent results are obtained when the polymerization is conducted at total emulsifier levels of about 3% by weight based on total monomers or less. Also, superior thickened latices result when the overpolymerization of the carboxyl-containing monomer is commenced when at least 70% by weight of the monomers making up the base polymer have been polymerized.

DETAILED DESCRIPTION

The present invention for obtaining thickenable polymer latices requires that a base polymer be overpolymerized with an olefinically unsaturated carboxylic acid monomer. The monomers employed to make the base polymer will typically be polymerized to at least 50% conversion before the overpolymerization is commenced.

The base polymer to be overpolymerized contains from about 50–99.8% by weight, and more generally about 75–95% by weight based on the total monomers, of a lower alkyl acrylate or mixture of lower alkyl acrylates having the structural formula

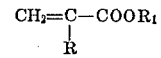

wherein R is hydrogen or a methyl group and $R_1$ represents an alkyl radical having from 1 to 8 carbon atoms. Representative monomers of the foregoing type include methyl acrylate, ethyl acrylate, the propyl acrylates and the butyl acrylates, 2-methylhexyl acrylate, n-octyl acrylate, 2-ethylhexyl acrylate, methyl methacrylate, ethyl methacrylate, octyl methacrylate and the like.

Polymerized with the alkyl acrylates to form the base polymer is about 0.1–10% by weight, and preferably 0.5–5% by weight based on the total monomer, of a glycidyl ester. These monomers contain a reactive epoxy group and ethylenic unsaturation have the general formula

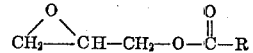

where R is an ethylenically unsaturated radical. Exemplary of such glycidyl esters are glycidyl acrylate, glycidyl methacrylate, glycidyl crotonate, glycidyl oleate, glycidyl abietate and the like. Excellent results are obtained when the radical R contains from 2 to 6 carbon atoms. Also useful in the present invention are glycidyl ethers which contain unsaturation such as vinyl, isopropenyl, allyl, methallyl or butenyl glycidyl ethers.

Useful base polymers can additionally contain one or more other polymerizable comonomers, preferably vinylidene ($CH_2=C<$) monomers, with the alkyl acrylate and the glycidyl ester monomers. Such polymerizable comonomers may constitute up to as much as 49% by weight based on the total monomers. Such polymerizable comonomers include conjugated dienes such as butadiene and isoprene; α-olefins such as ethylene, propylene and isobutylene; vinyl halides such as vinyl chloride, vinyl fluoride and vinylidene chloride; vinyl esters such as vinyl acetate; vinyl aromatics such as styrene, α-methylstyrene, vinyl toluene, vinyl naphthalene; alkyl vinyl ethers such as methyl vinyl ether, isopropyl vinyl ether, n-butyl vinyl ether and isobutyl vinyl ether; acrylic acid, methacrylic acid, ethacrylic acid, acrylonitrile, methacrylonitrile, acrylamide, methacrylamide, N-isopropylacrylamide, N-isopropylmethacrylamide, N-tert-butylacrylamide, N-tert-butylmethacrylamide, N-methylol acrylamide, N-ethanol acrylamide, N-propanol acrylamide, N-methylol methacrylamide, N-ethanol methacrylamide and the like.

The acid monomers useful for the overpolymerization are the olefinically unsaturated carboxylic acids containing at least one carbon-carbon olefinic double bond, and at least one carboxyl group, that is, an acid which contains an olefinic double bond susceptible to polymerization by virtue of it being in the $\alpha,\beta$-position with respect to the carboxyl group ($>$C=C—COOH) or having a terminal methylene grouping ($CH_2$=C$<$). Examples of the olefinically-unsaturated acids of this broad class includes such widely divergent materials as the acrylic acids such as acrylic acid itself, methacrylic acid, ethacrylic acid, $\alpha$-chloroacrylic acid, $\alpha$-cyanoacrylic acid, crotonic acid, $\beta$-acryloxy propionic acid, hydrosorbic acid, sorbic acid, $\alpha$-chlorosorbic acid, cinnamic acid, $\beta$-styryl acrylic acid, hydromuconic acid, itaconic acid, citraconic acid, fumaric acid, mesaconic acid, muconic acid, glutaconic acid, aconitic acid and the like. Also useful are acid anhydrides, such as maleic anhydride, wherein the anhydride group is formed by the elimination of one molecule of water from two carboxyl groups located on the same polycarboxylic acid molecule. Also, mixtures of two or more of the above-mentioned carboxylic monomers may be employed for the overpolymerization.

To obtain efficient thickening of the polymer latices of this invention about 0.1% by weight of the olefinically unsaturated carboxylic acid is overpolymerized. A particularly useful range is between about 0.5–6% by weight. In general, the carboxyl containing monomer will not exceed about 10% by weight.

When conducting the overpolymerization, the carboxyl-containing monomer may be overpolymerized by itself, or with one or more other polymerizable comonomers. Useful polymers are obtained when the other polymerizable monomers are vinylidene monomers employed in amounts so that the weight ratio of the vinylidene comonomer to the acid monomer overpolymerized is less than about 5:1. Excellent overpolymerizations have been obtained when the vinylidene comonomer to acid monomer weight ratio is maintained at 1:1 or below. The technique of overpolymerizing comonomers with the carboxylic acid monomer is especially useful to obtain stable latices especially when the overpolymerization is delayed until high conversions of the base monomers is achieved. In general, the same monomers which can be interpolymerized with the acrylate ester and glycidyl ester to form the base polymer, also serve as useful comonomers with the acid monomer in the overpolymerization step. Small amounts of alkyl acrylates, such as ethyl acrylate and methyl acrylate, have been found especially useful comonomers to be overpolymerized with the acid monomers. In addition to the usual vinylidene comonomers, small amounts of polyfunctional compounds such as methylene-bis-acrylamide, ethylene glycol dimethacrylate, diethylene glycol diacrylate, allyl pentaerythritol, divinyl benzene and the like may also be included in the overpolymerization. By including these vinylidene monomers and polyfunctional compounds, latices with excellent stability and capable of developing extremely high viscosities upon the addition of base are obtained.

The overpolymerization or grafting of the acid monomers onto the alkyl acrylate/glycidyl ester base polymer may be commenced when the polymerization of the base monomers is complete or essentially so. More generally, the overpolymerization is begun after about 50% conversion of the base monomers has been achieved. It is convenient and often advantageous to delay the overpolymerization until about 70% or more of the monomers comprising the base polymer are polymerized.

The polymerization process is conducted at a pH less than 7 and generally at a pH from about 1.5 to 5. The pH of the resulting acrylate latices may be increased by the addition of base at the end of the polymerization or at the time of its use to obtain the desired thickening. In general, the viscosity of the latex increases as the pH of the latex is raised. As the pH increases the viscosity increases and within the range of about pH 5–9 the viscosity increases very rapidly. At about pH 10 and above the change in viscosity again becomes less significant. It is a particularly important aspect of this invention that for a latex having a low total solids content extremely high viscosities are achieved. To increase the pH of the latices any of the well-known bases may be used. For example, sodium, potassium or ammonium hydroxide, ammonia, various amines such as methylamine, ethylamine, diethylamine, ethanolamine, morpholine and similar basic compounds are employed.

Conventional polymerization techniques are employed to prepare the self-thickening acrylate latices of this invention. Generally, the polymerization is conducted at a temperature of about 20–100° C. in the presence of a free radical generating catalyst. Commonly used free radical initiators include various peroxygen compounds such as the persulfates, benzoyl peroxide, t-butyl hydroperoxide, cumene hydroperoxide, t-butyl diperphthalate, pelargonyl peroxide and 1-hydroxycyclohexyl hydroperoxide; azo compounds such as azodiisobutyronitrile and dimethylazodiisobutyrate; and the like. Particularly preferred as polymerization initiators are the water-soluble peroxygen compounds such as hydrogen peroxide and the sodium, potassium and ammonium persulfates used by themselves or in activated "redox" type systems. Typical "redox" systems include alkali metal persulfates with: A reducing substance such as a polyhydroxy phenol and oxidizable sulfur compound such as sodium sulfite or sodium bisulfite, a reducing sugar, dimethylamino propionitrile, a diazomercapto compound and a ferricyanide compound, and the like. Heavy metal ions may also be used to activate the persulfate catalyzed polymerizations. Latices having exceptional stability with low amounts of coagulum are obtained with alkali metal and ammonium persulfate initiated polymerizations. The amount of initiator used will generally be in the range between about 0.1 to 3% by weight based on the monomers and preferably is maintained between 0.15 and 0.8% by weight. Usually the initiator will all be charged at the outset of the polymerization, however, incremental addition or proportioning of the initiator is often employed.

When an emulsifier is used to prepare the latices of this invention, they are the general types of anionic and nonionic emulsifiers. Excellent results have been obtained with the anionic emulsifiers. Exemplary anionic emulsifiers which may be employed are: alkali metal or ammonium salts of the sulfates of alcohols having from 8 to 18 carbon atoms, such as sodium lauryl sulfate; ethanolamine lauryl sulfate, ethylamine lauryl sulfate; alkali metal and ammonium salts of the sulfonated petroleum or paraffin oils; sodium salts of aromatic sulfonic acids, such as dodecane-1-sulfonic acid and octadiene-1-sulfonic acid; aralkyl sulfonates such as sodium isopropyl benzene sulfonate, sodium dodecyl benzene sulfonate and sodium isobutyl naphthalene sulfonate; alkali metal and ammonium salts of sulfonated dicarboxylic acid esters such as sodium dioctyl sulfosuccinate, disodium N-octadecylsulfosuccinamate; alkali metal or ammonium salts of free acids of complex organic mono- and diphosphate esters and the like. So-called non-ionic emulsifiers such as octyl- or nonylphenyl polyethoxyethanol and the like may also be used.

The amount of emulsifier used may be from about 0.01 to 6% or more by weight of the monomers. All the emulsifier may be added at the beginning of the polymerization or it may be added incrementally or by proportioning throughout the run. Typically, a substantial portion of the emulsifier is added at the start of the base polymer polymerization and the remainder when the overpolymerization with the carboxyl-containing monomers is commenced. Emulsifier free systems may also be employed to form the polymer latices of this invention.

Typical polymerizations for the preparation of the self-thickening acrylate latices of this invention are conducted by charging the monomers for the base polymer into the polymerization reactor which contains water and a portion of the emulsifying agent. The reactor and its contents are heated and the initiator added. At the desired point in the polymerization, an aqueous premix containing the carboxyl-containing monomer and any other monomers to be overpolymerized and the remainder of the emulsifier is charged. Throughout the initial polymerization and the overpolymerization the temperature is maintained with a cooling bath. Excellent results have been obtained when the base monomers and emulsifier are combined to form an aqueous premix and about 5–15% by weight of this premix is charged and the remainder of the premix proportioned into the reactor at a uniform rate until the base polymerization is complete or essentially complete. It is believed that such monomer pre-emulsification and seeding techniques avoid serious heat transfer problems, thus giving better control of the particle size of the base polymer and a more stable latex.

The following examples serve to illustrate the invention more fully. All parts or percentages are by weight unless noted otherwise.

Latex viscosities are measured with a Brookfield RVF viscometer. The stability of the latex is obtained by agitating the latex for five minutes at high sheer with a slender, filtering and determining the amount of coagulum formed.

EXAMPLE I

Two polymer latices were prepared by polymerizing ethyl acrylate with glycidyl acrylate (Latex A) and glycidyl methacrylate (Latex B) to form the base polymer and overpolymerizing with methacrylic acid.

The following recipes were employed:

| | Parts | |
|---|---|---|
| | A | B |
| Ethyl acrylate | 94.5 | 94.5 |
| Glycidyl acrylate | 2.5 | |
| Glycidyl methacrylate | | 2.5 |
| Methacrylic acid | 3 | 3 |
| Water | 97 | 97 |
| Sodium lauryl sulfate | 0.3 | 0.3 |
| Ammonium persulfate | 0.26 | 0.26 |

The polymerization vessels were charged with about 63 parts water and about 10–15% of a premixed solution containing 30 parts of water, the ethyl acrylate and glicidyl ester monomers and 0.2 part of emulsifier. The reactors were than heated to about 60–70° C. by the application of external heat and the ammonium persulfate initiator dissolved in 1 part water charged with vigorous agitation to initiate the polymerization. The remainder of the monomer premix was then proportioned into the reactor over a period of about one hour. The temperature of the reaction was maintained at about 80° C. during the monomer proportioning. Immediately following the proportioning, a second premix containing the methacrylic acid emulsified with 0.1 part sodium lauryl sulfate in 3 parts water was charged at a uniform rate for 15 minutes. At the completion of this charge, the polymerizations were maintained for an additional hour at 80° C. to insure high conversion. The resulting fluid latices contained about 50% total solids and had a viscosity of less than 30 cps. Also, the latex had excellent stability. The pH of samples of the original latex was adjusted to about 9.5 by the addition of ammonium hydroxide and Latex A had a viscosity of 360,000 cps. and the viscosity of Latex B was 200,000 cps. When the latices were diluted with water to about 30% total solids, the viscosities were 240,000 cps. and 24,000 cps., respectively, at pH 9.5.

For comparative purposes and to demonstrate the superior thickening obtained with the polymer latices of this invention at low total solids, a polymer latex having the same overall composition except that N-methylol acrylamide was substituted for the glycidyl monomer was prepared employing identical polymerization techniques. Three parts methacrylic acid were overpolymerized. When the pH of this latex, diluted to 30% total solids, was adjusted to 9.5 the viscosity was less than 3,000 cps. Also, latices prepared but which omitted the glycidyl ester, the methacrylic acid, or which were prepared employing conventional copolymerization techniques did not thicken sufficiently to make them acceptable for most adhesive applications.

EXAMPLE II

To demonstrate the versatility of the present invention a series of thickenable latices of varied compositions were prepared according to the procedure of Example I. The recipes were as follows:

| | Latex | | |
|---|---|---|---|
| | C | D | E |
| Base monomers (parts): | | | |
| Ethyl acrylate | | 48.8 | 93 |
| n-Butyl acrylate | 80.9 | | |
| 2-ethylhexyl acrylate | | 45 | |
| Glycidyl acrylate | 1.5 | 1.8 | |
| Glycidyl methacrylate | | | 2 |
| Acrylonitrile | 12 | | 3 |
| Acrylamide | 3.5 | 1.8 | |
| Overpolymerized monomers (parts): | | | |
| Methacrylic acid | 2.6 | 2.6 | 2.0 |
| Methylene-bis-acrylamide | | | 0.05 |
| Water | 97 | 97 | 97 |
| Sodium lauryl sulfate | 0.3 | 0.3 | 0.3 |
| Ammonium persulfate | 0.26 | 0.26 | 0.26 |

Latex viscosities for C and D (45–50% total solids, pH 9.5) were greater than 2,000,000 cps. These same latices diluted to 30% total solids (pH 9.5) had viscosities of 180,000 cps. and 145,000 cps. respectively.

EXAMPLE III

A series of latices were prepared with varying amounts of the glycidyl ester monomer. The polymerization procedure was the same as described in Example I and the recipes were as follows:

| | Latex | | |
|---|---|---|---|
| Base monomers (parts) | F | G | H |
| n-Butyl acrylate | 81.9 | 80.9 | 79.4 |
| Acrylonitrile | 12 | 12 | 12 |
| Acrylamide | 3.5 | 3.5 | 3.5 |
| Glycidyl methacrylate | 0.5 | 1.5 | 3.0 |
| Methacrylic acid | 2.6 | 2.6 | 2.6 |
| Water | 97 | 97 | 97 |
| Sodium lauryl sulfate | 0.3 | 0.3 | 0.3 |
| Ammonium persulfate | 0.26 | 0.26 | 0.26 |

All three latices contained about 50% total solids and had excellent stability. When the pH of these latices was raised to about 9.7 with the addition of ammonium hydroxide pronounced thickening was obtained (>1,500,000 cps.). Similarly, excellent thickening was obtained when these latices were diluted.

To demonstrate the criticality of overpolymerizing the acid monomer over the base polymer, the polymerization of F was repeated in an identical manner, except that the methacrylic acid was polymerized in the normal manner, by charging together with the n-butyl acrylate, acrylonitrile, acrylamide and glycidyl methacrylate. When the pH of the resulting latex was adjusted to 9.5 with ammonium hydroxide, the viscosity was 4500 cps. Diluted to 30% total solids, the latex had a viscosity of only 20 cps. at pH 9.5.

It is evident from the above examples that extremely useful latices which are capable of being thickened without the addition of natural or synthetic thickening agents can be prepared by the overpolymerization of carboxyl-containing monomers onto a base polymer comprised of lower alkyl acrylates and glycidyl esters. To thicken these latices all that is required is to raise the pH by the addition of base. The polymer latices have good stability in both the thickened or unthickened states and a wide range of viscosities can be achieved. Extremely high viscosities are obtained at low total solids.

The thickened alkyl acrylate latices of this invention have been found to be particularly useful in applications where thickened latices are required as, for example, impregnating paper and nonwoven fabric, as fabric coatings for laminating fabric and as carpet backings.

I claim:

1. A polymer composition consisting essentially of (1) from about 50 to 99.8% by weight, based on the total monomers of at least one lower alkyl acrylate having formula

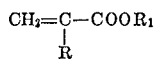

wherein R is a hydrogen or methyl group and $R_1$ is an alkyl radical containing from 1 to 8 carbon atoms copolymerized with (2) about 0.1 to 10% by weight of a glycidyl ester of the formula

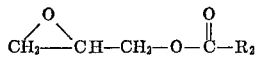

wherein $R_2$ is an ethylenically unsaturated radical containing from 2 to 6 carbon atoms, and (3) up to 49% by weight of at least one other vinylidene $C_2=C<$ monomer to form a base polymer, overpolymerized with (4) about 0.1 to 10% by weight of an olefinically unsaturated carboxylic acid monomer and less than about a 1:1 weight ratio of vinylidene comonomers to acid monomer said vinylidene comonomers being selected from the group consisting of methylene bis-acrylamide, ethylene glycol dimethacrylate, diethylene glycol diacrylate and divinyl benzene.

2. The copolymer of claim 1 wherein the olefinically unsaturated carboxylic acid monomer is selected from the group consisting of acrylic acid and methacrylic acid.

3. The copolymer of claim 1 which contains about 75 to 95% by weight of the lower alkyl acrylate, 0.5 to 5% by weight of the glycidyl ester, 0.5 to 6% by weight of the carboxylic acid overpolymerized and the weight ratio of the vinylidene comonomer to the carboxylic acid monomer is less than about 5:1.

4. The polymer of claim 2 wherein the glycidyl ester is selected from the group consisting of glycidyl acrylate and glycidyl methacrylate.

5. The polymer of claim 4 wherein the lower alkyl acrylate is selected from the group consisting of ethyl acrylate, n-butyl acrylate and 2-ethylhexyl acrylate.

6. The copolymer of claim 5 wherein the vinylidene comonomer is selected from the group consisting of acrylonitrile, acrylamide and methylene-bis-acrylamide.

7. A copolymer of claim 1 in aqueous dispersion.

8. The copolymer of claim 7 in aqueous dispersion which has been thickened by the addition of base.

9. An emulsion polymerization process for the production of thickenable polymer latices which comprises first copolymerizing monomers consisting essentially of about (1) 50 to 99.8% by weight, based on the total monomers, of at least one lower alkyl acrylate having the formula

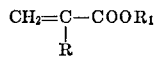

wherein R is hydrogen or a methyl group and $R_1$ is an alkyl radical containing from 1 to 8 carbon atoms with (2) about 0.1 to 10% by weight of a glycidyl ester of the formula

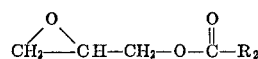

wherein $R_2$ is an ethylenically unsaturated radical containing from 2 to 6 carbon atoms and (3) up to 49% by weight of at least one other vinylidene $CH_2=C<$ monomer until about 50% by weight of the monomers have been polymerized and then overpolymerizing about 0.1 to 10% by weight of an olefinically unsaturated carboxylic acid monomer and less than about a 1:1 weight ratio of vinylidene comonomers to acid monomer, said vinylidene comonomer being selected from the group consisting of methylene bis-acrylamide, ethylene glycol dimethacrylate, diethylene glycol diacrylate and divinyl benzene.

References Cited

UNITED STATES PATENTS

| 3,223,670 | 12/1965 | Cantor et al. | 260—29.6 |
| 3,242,123 | 3/1966 | Mayfield et al. | 260—29.6 |
| 3,256,233 | 6/1966 | Hahn et al. | 260—29.6 |
| 3,296,175 | 1/1967 | Fantl et al. | 260—29.6 |
| 3,297,621 | 1/1967 | Taft | 260—29.6 |
| 3,309,330 | 3/1967 | Settlage | 260—29.6 |
| 3,401,134 | 9/1968 | Fantl et al. | 260—29.6 |
| 3,431,226 | 3/1969 | Warson et al. | 260—29.7 |

MELVIN GOLDSTEIN, Primary Examiner

U.S. Cl. X.R.

260—29.6 TA, 885

UNITED STATES PATENT OFFICE
CERTIFICATE OF CORRECTION

PATENT NO. : 3,810,859
DATED : May 14, 1974
INVENTOR(S) : Bela K. Mikofalvy

It is certified that error appears in the above-identified patent and that said Letters Patent are hereby corrected as shown below:

Column 5, line 27, "slender" should read --blender--.

Column 7, line 29, "$C_2=C{\Big<}$" should read --$CH_2=C{\Big<}$--.

Signed and Sealed this fifth Day of August 1975

[SEAL]

Attest:

RUTH C. MASON
Attesting Officer

C. MARSHALL DANN
Commissioner of Patents and Trademarks